3,414,556
CHLORINATED POLYETHYLENE
William M. Bungo, Parsippany, and Carl R. Eckardt, Morris Plains, N.J., assignors to Allied Chemical Corporation, New York, N.Y., a corporation of New York
No Drawing. Filed Apr. 15, 1965, Ser. No. 448,283
7 Claims. (Cl. 260—94.9)

ABSTRACT OF THE DISCLOSURE

A new process for chlorinating polyethylene comprising the steps of:
(a) preparing an aqueous slurry containing up to about 22% by weight of a particulate polyethylene wax having a molecular weight of no greater than about 18,000 and an average particle size of no greater than about 600 microns:
(b) contacting said slurry with up to 1 part by weight of chlorine per part of unchlorinated wax per hour at a temperature of up to about 70° C. for a time sufficient to afford a chlorinated polyethylene wax containing up to about 75% by weight of chlorine:
(c) after chlorination of said wax has commenced, contacting said wax with from about 0.05% to about 0.75% by weight of oxygen based on unchlorinated wax, said contacting with oxygen being substantially completed before said wax reaches a chlorine content of greater than about 45% by weight; and
(d) separating the thus chlorinated polyethylene wax from said slurry.

---

This invention relates to chlorinated polyethylene wax compositions and to a process for their preparation. More particularly, this invention relates to polyethylene wax compositions of high chlorine content and a process for their preparation by chlorination in an aqueous slurry.

Processes are known for preparing chlorinated branched chain polyethylene waxes, particularly a process wherein a polyethylene telomer wax, which has been previously oxidized, is chlorinated in carbon tetrachloride or other chlorine-stable organic medium. Telomer waxes are prepared by polymerizing ethylene in the presence of a co-reactant which adds to the polymer chains in a terminal position. These co-reactants are usually normally liquid organic compounds free of olefinic unsaturation such as lower alkanols, a ketone, etc. The resulting chlorinated waxes, at chlorine contents below about 30% by weight, are not completely soluble at room temperature in inexpensive aromatic solvents such as benzene or toluene. Accordingly, these chlorinated waxes of lower chlorine content are not suitable for use in solution as coatings. Only at higher chlorine content such as above 30% by weight where polyethylene crystallinity decreases do the chlorinated waxes become soluble at room temperatures. In the chlorination of relatively high molecular weight polyethylene resins, chlorination of the polymer in an aqueous slurry is preferred over chlorination in an organic medium, since it obviates the difficulty and expense of recovering the organic medium. Chlorination of polyethylene wax, however, by an aqueous slurry process using elevated temperatures favoring rapid reaction tends to result in particle agglomeration which is undesirable since chlorination is no longer uniform; the surface of the agglomerated resin particle only becomes chlorinated, while the center of the particle is left substantially unchlorinated.

We have discovered that by incorporating a small, strictly limited amount of oxygen into the aqueous slurry of the polyethylene wax during the early stages of chlorination at low temperatures, agglomeration is eliminated and chlorination can be continued up to high levels of chlorine content, while retaining the excellent thermal stability of the wax to prepare chlorinated waxes which are soluble in aromatic solvents.

According to our invention, polyethylene waxes, preferably polyethylene-alkanol telomer waxes can be chlorinated up to about 75% by weight chlorine by an aqueous slurry process at low temperatures without agglomeration by incorporating a limited amount of oxygen into the resin before the chlorine level reaches about 45% by weight. The resins obtained are thermally stable for extended periods above the melting point and thus are suitable for applications such as hot melt adhesives and protective coatings. The chlorinated polyethylene waxes prepared by the process of this invention contain residual polyethylene crystallinity which decreases as the amount of chlorine in the resin increases, so that resins containing over about 60% by weight chlorine contain only small amounts of crystallinity. Resins of the present invention, containing about 70% by weight chlorine show a less random placement of chlorine atoms along the polyethylene chain than do resins produced by a solution chlorination process with consequent differences in physical properties. The glass transition temperature is higher when residual polyethylene crystallinity is present. The structural difference, we believe, also contributes to the excellent thermal stability of our resins.

The polyethylene waxes preferred in our process are polyethylene-alkanol telomer waxes such as those prepared according to United States Patents Nos. 2,504,400 and 2,683,141 issued to Allied Chemical Corporation. These waxes are prepared by polymerizing ethylene under wax-forming conditions in the presence of a liquid aliphatic alcohol having from 1 to 10 carbon atoms, preferably isopropanol, which consequently contains the corresponding alcohol group in their structures. For example, when ethylene is polymerized in the vapor phase in the presence of isopropanol vapor at pressures between 100 and 1000 atmospheres and temperatures within the range of 100 to 300° C., the structure of the resulting preferred telomer waxes may be written as

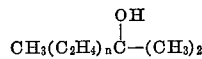

wherein $n$ is an integer and the waxes are a mixture of individual homologs having varying values for $n$. The preferred product has an average molecular weight in the range between about 1500 and about 3000, melting points between about 95 and 110° C., and melt viscosities from about 125 to 700 centipoises at 120° C. All melt viscosities were determined using a Brookfield viscometer.

In a preferred process the wax is added to water in a corrosion resistant reactor suitably fitted with means for controlling temperature, efficient stirring, inlet and outlet tubes for gases, and pressure gauges. The wax is added in finely divided form so that the average diameter of the particles is no larger than about 600 microns, preferably it will be 400 microns or less. Up to about 22% by weight solids in the liquid can be employed, but a slurry density of about 5% to about 10% by weight is preferred. Use of a high slurry density is desirable to obtain a good production rate for the apparatus, but we have found that when the solids concentration in the slurry is too high, the solids tend to agglomerate despite the fact that other conditions are carefully controlled. The slurry is degassed to eliminate all oxygen from the atmosphere by any convenient means such as a nitrogen sweep, boiling under vacuum, etc. Gaseous, oxygen-free chlorine, containing less than 50 parts per million and preferably less than 10 parts per million of oxygen, is then continuously added to the reactor at a constant rate. The temperature of the reaction can be from room temperature up to about 70° C., but the preferred range is 45-60° C. The temperature can be maintained at a constant level or can be allowed to vary within the above limits. At temperatures above the specified range, the particles agglomerate. When chlorination has begun, 0.05% to 0.75% by weight of the starting wax solids of oxygen is added during the initial stages of chlorination. The preferred amount of oxygen is 0.09–0.25% by weight and it is preferably added along with the first 10% of the chlorine.

The rate of chlorine addition can be up to 1 pound of chlorine per pound of wax per hour, but preferably from about 0.1 to about 0.5 pounds of chlorine per pound of wax per hour is added. Reaction is slow at first, but it accelerates as chlorination proceeds, as shown by pressure variations in the reactor. The pressure is not critical and can be as high as the tolerance of the equipment employed will permit. The time of chlorination depends upon the temperature, rate of chlorine addition, and level of chlorine content desired.

No chlorination catalyst is required for our process; we obtain excellent rates of chlorination without a catalyst at low temperatures.

The chlorination reactor should be inert to chlorine or hydrogen chloride, i.e., constructed of corrosion-resistant materials or be glass lined, etc.

After the chlorination step is complete, the excess water layer, which contains hydrogen chloride, is drawn off. The residual hydrogen chloride and water can be removed in any convenient manner such as by washing with water to remove hydrogen chloride followed by a drying step, or the wax can be dried in a hot air oven or vacuum oven, which eliminates the washing since the hydrogen chloride and water form an azeotropic mixture which is easily removed. For instance, at a pressure of 50 mm. of mercury, a mixture containing 23.4% by weight hydrogen chloride boils at 48.7° C.; at atmospheric pressure, a mixture containing 20.2% by weight hydrogen chloride boils at 108.6° C.

The amount of crystallinity can be determined using a differential thermal analysis technique hereinafter referred to as DTA. Crystallinity of the chlorinated polymers of ethylene of the invention can be estimated using polyethylene of 50% crystallinity (as determined by X-ray) as a standard sample. Melting points are also determined by this technique.

By thermally stable resins, we mean those which have a constant melt viscosity after heating and working for 20 minutes or more at temperatures above the melting point of the resin. Further, a stable resin will show no decrease in molecular weight or other evidence of decomposition or reaction under conditions of use such as color changes, evolution of gases or bubbling, changes in pH, etc. These criteria can be illustrated by testing in a dynamic tester such as sold by the C. W. Brabender Instruments, Inc. under the trade name Plasti-Corder. This apparatus consists of a heat chamber which can be regulated to the desired temperature level, containing two rolls which turn into each other. These rolls are fitted with a suitable device which measures the amount of force required to mix the resin at the temperature of the test. If the resin is unstable, crosslinking can occur during heating and working and it will require an increasing force to mix or work the resin in the rolls. Or, if the resin decomposes, a sudden decrease in the torque required for mixing will be noted. A 15-minute, or longer, period of stability represents an acceptable resin capable of undergoing various operations requiring heat such as extruding, calendering, etc., with little or no loss in its original physical properties. Test results obtained in the Plasti-Corder are expressed as meter kilograms of force hereinafter designated as MKG.

The following examples set forth preferred modes contemplated for carrying out the present invention. The waxes of the examples were stabilized with a stabilizing composition generally used for stabilizing chlorinated polyethylene against the effect of elevated temperature.

The stabilizing mixture consisted of 4 parts of a barium-sodium compound sold by National Lead Company under the trade name CS–137, and 1 part of a phenyl phosphite compound sold by Naugatuck Chemicals, under the trade name Polygard, per 100 parts resin.

The intrinsic viscosity was determined by standard methods as described in ASTM D–1601–61T. This technique involves extrapolation of the reduced viscosity to indefinite dilution. The results given in the examples were determined for reduced viscosities measured as a 1% by weight solution in decalin at 100° C. The molecular weight can be calculated from the intrinsic viscosity according to the following equation:

$$\eta i = 6.77 \times 10^{-4} M^{0.67}$$

where $\eta i$ is intrinsic viscosity and M is molecular weight.

The glass transition temperature, or Tg, determines the stiffness properties of plastics as a function of temperature by means of a torsional test, described in ASTM D–1043–61T. In general, the glass transition temperature increases as the chlorine content increases.

EXAMPLE 1

Six pounds of solid particles of polyethylene-isopropanol telomer wax of intrinsic viscosity 0.16, calculated average molecular weight of 3500, melt viscosity of 180 centipoises at 140° C., DTA melting point 100–110° C., and having a polyethylene crystallinity of 25–45% was ground to a particle size of 400 microns and slurried in deionized water at about 5.5% by weight of solids in a 20-gallon jacketed, glass-lined reactor fitted with an agitator, gas feed lines, pressure recording instrument, thermowell and appropriate valves and pipes. Chlorine and oxygen were supplied from cylinders which rested on platform scales so that the weight of the gases fed to the reactor could be measured. The chlorine was analyzed for oxygen and contained less than 10 parts per million. The reaction system was purged of air and the temperature of the system brought to 45° C. Chlorine was added at a constant rate of 0.245 pound of chlorine per pound of wax per hour until 25.5 pounds or a total of 64.3% by weight, based on the chlorinated wax, had been added to the wax. At the start of chlorination, 0.0208 pound of oxygen were added to the reactor, and 0.0138 pound of oxygen were added with each ¼ pound of chlorine until 0.09 pound, or 0.15% based on the weight of the unchlorinated wax, had been added. Agitation was slow at first to avoid throwing particles onto the walls of the reactor where local overheating might occur. As more chlorine was added to the wax particles, they became more "wettable" and dispersed into the water layer when agitation was increased so as to provide good contact between the chlorine in the atmosphere above the reaction mixture and the slurry. When oxygen was added to the reaction mixture, the rate of chlorination decreased somewhat, as shown by a pressure build-up in the system. However, as the chlorine content of the wax increased, the rate of chlorination increased and the pressure went down again. The total time of reaction was 17.4 hours.

The chlorinated wax was separated from the water layer by decanting and dried at 50° C. in a Pfaudler rotary vacuum dryer at a pressure of 50 mm. of mercury. The moisture and hydrogen chloride content were reduced to acceptable limits.

The chlorinated wax obtained had an intrinsic viscosity of 0.13, melting point of 90° C., glass transition temperature of 84° C., and about 3% residual polyethylene crystallinity.

The chlorinated wax was completely soluble in toluene at room temperature. It has a low viscosity at high solids loading which can be seen from the following data:

| Percent solids: | Viscosity, cps. |
|---|---|
| 10 | 3.8 |
| 20 | 7.8 |
| 50 | 640.0 |

The thermal stability of this chlorinated product was excellent, based on Bradender testing, as shown by a constant torque of 1.50 M Kg. at 160° C. for 30 minutes with the above-mentioned stabilizer mixture. When 3 parts by weight per 100 parts by weight wax of a Bisphenol A epoxide resin sold by Shell Chemical Company under the trade name Epon 828 was added, the torque was reduced to 1.00 M Kg. under the same conditions.

EXAMPLE 2

The wax used for Example 1 was chlorinated in similar manner to a chlorine content of 68.8% by weight based on the chlorinated wax, and 0.25% by weight oxygen, based on the unchlorinated wax, was added to the reaction mixture. Total reaction time was 20.7 hours.

The resultant chlorinated wax had an intrinsic viscosity of 0.10, melting point of 89° C. and a glass transition temperature of 109° C. The chlorinated wax was essentially amorphous according to differential thermal analysis, found having less than 1% crystallinity.

The thermal stability was excellent based on Barbender results of 2.8 M Kg. at 163° C. for 30 minutes with the stabilizer mixture of Example 1; when 3 parts per 100 of Epon 828 were added, the torque dropped to 2.20 M Kg.

Solution viscosities of the resin in toluene are given below:

| Percent solids: | Viscosity, cps. |
|---|---|
| 10 | 3.6 |
| 20 | 7.5 |
| 35 | 40.0 |
| 50 | 630.0 |

The resin was completely soluble in toluene at room temperature up to about 65 weight percent.

EXAMPLE 3

The polyethylene wax used in Example 1 was chlorinated in similar manner to a level of 58.3% by weight chlorine based on the chlorinated wax, while adding a total of 0.71% by weight based on the unchlorinated wax, of oxygen. The slurry density was 5.3% solids. The initial temperature was 30° C., and it was allowed to rise to 45° C. during the course of the reaction. The total time of reaction was 12.0 hours.

The resultant product had an intrinsic viscosity of 0.10, melting point of 94° C., and a glass transition temperature of 62° C. The residual polyethylene crystallinity was about 10%.

The thermal stability of the resin was excellent, 0.10 M Kg. at 160° C. for 16 minutes and 2.70 M Kg. at 110° C. for 30 minutes.

EXAMPLE 4

Chlorination of the polyethylene wax used in Example 1 was carried out in a similar manner to 49.8% by weight chlorine, based on the chlorinated wax while 0.06% by weight, based on the unchlorinated wax, of oxygen was added. The slurry density was 5.3% by weight solids. Marginal agglomeration did occur. The time of reaction was 9.9 hours.

The resin had an intrinsic viscosity of 0.11, melting point of 95° C., and glass transition temperature of 43° C. The residual polyethylene crystallinity was 10%.

Thermal stability was 0.1 M Kg. at 152° C. for 30 minutes using a stabilizer mixture of 1 part Polygard and 1 part CS–137 per hundred parts of resin.

EXAMPLE 5

Chlorination of the polyethylene wax described in Example 1 was carried out at a higher rate of 0.358 pounds of chlorine per pound of wax per hour to a chlorine level of 68.9% by weight, based on the chlorinated wax, other conditions being the same. The total reaction time was 13.8 hours.

The product was compared to a chlorinated wax control prepared by a solution chlorination process according to United States Patent 2,779,754, except that no light was used during chlorination of the control. There was less than 1% of crystallinity both in the wax of the example and in the control, as determined by differential thermal analysis, which was expected at this chlorine level. However, structural differences were found by nuclear magnetic resonance analysis which showed a sharp peak at 128 parts per million using tetramethylsilane as a reference for the aqueous slurry chlorinated product, but no similar peak was observed in the case of the solution chlorinated control. This peak indicates that a —$CH_2$— group is adjacent to another —$CH_2$— group, rather than to a chlorinated group. The following table illustrates the relative number of mols of various groups:

| Mode of chlorination | Percent Cl | N(CH₂)n | NCH₂X | NCHCl |
|---|---|---|---|---|
| Solution | 68.3 | 0 | 64 | 100 |
| Slurry | 68.9 | 6 | 55 | 100 | where N($CH_2$)n refers to mols of —$CH_2$— groups adjacent to other —$CH_2$— groups and N$CH_2$X is the mols of —$CH_2$— groups adjacent to CHCl groups. This illustrates that there is a more random chlorine placement of the solution chlorinated wax than those chlorinated by an aqueous slurry process. The difference in chlorine placement was shown also by infrared analysis wherein differences in the —CH— stretch region at 3.4–3.5$\mu$ and —$CH_2$— deformation region at 6.8–7.0$\mu$ were noted. These differences indicate the presence of more "polyethylene type" groups in the aqueous slurry chlorinated resin.

The following table illustrates the excellent thermal stability of the resin as measured in the Plasti-Corder:

| M Kg. | Time, minutes | Stock temp., ° C. | Stabilization (parts/100) |
|---|---|---|---|
| 2.2 | 60 | 167 | 2—Epon 828. |
| 2.5 | 60 | 160 | 1—Polygard, 4—CS-137. |
| 0.8 | 38 | 185 | 2—Epon 828. |

EXAMPLE 6

A polyethylene-isopropanol telomer wax, having an intrinsic viscosity of 0.12, molecular weight of about 2300, a melting point of 110° C., melt viscosity of 160 centipoises at 140° C., and polyethylene crystallinity of 26%, was chlorinated as in Example 1 at a rate of 0.354 pounds of chlorine per pound of wax per hour to a chlorine content of 70.28%, based on the chlorinated wax, adding 0.15% by weight oxygen, based on the unchlorinated wax. Total reaction time was 14.4 hours. The resultant chlorinated wax had an intrinsic viscosity of 0.09.

EXAMPLE 7

A low density branched-chain polyethylene wax commercially produced by Union Carbide Corporation as "DYLT" having a molecular weight of about 15,000 to about 18,000, intrinsic viscosity of 0.49, melting point of 108° C., melt viscosity of 2200 at 140° C., and polyethylene crystallinity of 10–15%, was chlorinated as in Example 1 at a rate of 0.325 pounds of chlorine per pound of polyethylene per hour to a chlorine content of 64.6% by weight, based on the chlorinated wax, adding 0.15% by weight oxygen, based on the unchlorinated wax. Total reaction time was 15.6 hours.

The chlorinated product had an intrinsic viscosity of 0.27.

The experiment was repeated without the addition of oxygen, but agglomeration occurred when only 47.6% by weight of chlorine, based on the chlorinated wax, had been added.

As can be seen from the foregoing examples, oxygen addition during chlorination was completed before 45% chlorine combined with the polymer. For instance, in Example 1, 1.23 pounds chlorine was added before the adding of oxygen was terminated, corresponding to about 0.6 pounds combined chlorine, or to about 9% chlorine content based on chlorinated wax.

We claim:
1. A process for chlorinating polyethylene comprising the steps of:
   (a) preparing an aqueous slurry containing up to about 22% by weight of a particulate polyethylene wax having a molecular weight of no greater than 18,000 and an average particle size of no greater than about 600 microns:
   (b) contacting said slurry with up to 1 part by weight chlorine per part of unchlorinated wax per hour at a temperature of up to about 70° C. for a time sufficient to afford a chlorinated polyethylene wax containing over about 50% and up to about 75% by weight of chlorine;
   (c) after chlorination of said wax has commenced, contacting said wax with from about 0.05% to about 0.75% by weight of oxygen based on the weight of unchlorinated wax, said contacting with oxygen being substantially completed before said wax reaches a chlorine content of greater than about 45% by weight; and
   (d) separating the thus chlorinated polyethylene wax from said slurry.

2. A process in accordance with claim 1 wherein said contacting with chlorine is effectuated at a temperature ranging from about 45° C. to about 60° C., and wherein said chlorine is added at a rate ranging from about 0.1 to 0.5 parts by weight of chlorine per part of unchlorinated wax per hour.

3. A process in accordance with claim 1 wherein said particulate polyethylene wax has an average particle size of no greater than about 400 microns.

4. A process in accordance with claim 1 wherein said polyethylene wax is present in said aqueous slurry in an amount ranging from about 5% to about 10% by weight.

5. A process in accordance with claim 1 wherein the amount of oxygen with which said wax is contacted ranges from about 0.09% to about 0.25% by weight based on unchlorinated wax and wherein said contacting with oxygen is substantially completed before greater than about 10% by weight of chlorine is added to said polyethylene wax.

6. A process in accordance with claim 1 wherein said polyethylene wax is a polyethylene alkanol telomer wax, said alkanol having from 1 to 10 carbon atoms.

7. A process in accordance with claim 6, wherein said alkanol is propanol.

References Cited

UNITED STATES PATENTS

| | | | |
|---|---|---|---|
| 2,422,919 | 6/1947 | Myles et al. | 260—94.9 |
| 2,779,754 | 1/1957 | Erchak | 260—94.9 |
| 3,227,781 | 4/1966 | Klug et al. | 260—94.9 |

JOSEPH L. SCHOFER, *Primary Examiner.*

L. EDELMAN, *Assistant Examiner.*